US006757534B2

United States Patent
Bach et al.

(10) Patent No.: US 6,757,534 B2
(45) Date of Patent: *Jun. 29, 2004

(54) CELLULAR PHONE WITH SPECIAL STANDBY FEATURE

(76) Inventors: Lanae E. Bach, 17460 Lakeview Dr., Morgan Hill, CA (US) 95037; Joseph Bach, 17460 Lakeview Dr., Morgan Hill, CA (US) 95037

( * ) Notice: Subject to any disclaimer, the term of this patent is extended or adjusted under 35 U.S.C. 154(b) by 0 days.

This patent is subject to a terminal disclaimer.

(21) Appl. No.: 09/860,910

(22) Filed: May 18, 2001

(65) Prior Publication Data

US 2001/0023182 A1 Sep. 20, 2001

Related U.S. Application Data

(62) Division of application No. 09/038,190, filed on Mar. 10, 1998, now Pat. No. 6,377,795.

(51) Int. Cl.⁷ .............................................. H04M 3/42
(52) U.S. Cl. .................. 455/417; 455/414.1; 455/567
(58) Field of Search ................................. 455/417, 414, 455/567, 445, 413, 412, 411, 90.1, 550.1, 563, 569; 379/210, 214, 88

(56) References Cited

U.S. PATENT DOCUMENTS

| 5,276,731 A | | 1/1994 | Arbel et al. ................... 379/88 |
| 5,317,624 A | * | 5/1994 | Obana et al. ................. 455/412 |
| 5,329,578 A | * | 7/1994 | Brennan et al. ............... 379/67 |
| 5,475,739 A | * | 12/1995 | Norimatsu ................... 455/569 |
| 5,548,636 A | * | 8/1996 | Bannister et al. ........... 379/201 |
| 5,553,125 A | * | 9/1996 | Martensson ................. 379/140 |
| 5,559,860 A | * | 9/1996 | Mizikovsky ................. 455/413 |
| 5,570,413 A | * | 10/1996 | Ahlberg et al. ............. 455/552 |
| 5,604,797 A | * | 2/1997 | Adcock ....................... 379/373 |
| 5,629,693 A | | 5/1997 | Janky .......................... 340/988 |
| 5,636,265 A | | 6/1997 | O'Connell et al. .......... 455/412 |
| 5,657,372 A | * | 8/1997 | Ahlberg et al. ............. 455/414 |
| 5,669,061 A | | 9/1997 | Schipper ..................... 455/429 |
| 5,758,280 A | * | 5/1998 | Kimura ....................... 455/412 |
| 5,845,219 A | * | 12/1998 | Henriksson ................. 455/567 |
| 5,867,562 A | * | 2/1999 | Scherer ......................... 379/88 |
| 5,877,724 A | | 3/1999 | Davis ........................... 342/357 |
| 5,884,160 A | * | 3/1999 | Kanazaki ..................... 455/413 |
| 5,905,958 A | * | 5/1999 | Houde ......................... 455/437 |
| 5,918,179 A | * | 6/1999 | Foladare et al. ............ 455/445 |
| 5,933,477 A | * | 8/1999 | Wu .......................... 379/88.26 |
| 5,945,919 A | | 8/1999 | Trask ................... 340/825.491 |
| 5,978,689 A | * | 11/1999 | Tuoriniemi et al. ......... 455/569 |
| 6,018,671 A | * | 1/2000 | Bremer ....................... 455/567 |
| 6,070,068 A | * | 5/2000 | Sudo ........................... 455/414 |
| 6,377,795 B1 | * | 4/2002 | Bach et al. .................. 455/417 |
| 6,449,480 B1 | * | 9/2002 | Brownlee et al. ........... 455/435 |

* cited by examiner

Primary Examiner—Erika Gary
Assistant Examiner—Temica M. Davis
(74) Attorney, Agent, or Firm—Joseph Bach

(57) ABSTRACT

A cellular phone is disclosed having a SPECIAL mode of operation. According to one embodiment, in the SPECIAL operating mode a channel of communication is automatically established upon receipt of an incoming call. Additional features enable muting of the ringing after the first ring, and sending a note to the caller that the phone in the SPECIAL mode. This allows a user in a meeting to receive a call and have time to exit the meeting to talk to the caller. According to another embodiment, is the special operating mode the phone blocks all incoming calls for a pre-programmed time period, and thereafter resumes normal operation.

13 Claims, 3 Drawing Sheets

CELLULAR PHONE WITH SPECIAL STANDBY FEATURE

REFERENCE TO RELATED APPLICATION

This Application is a Divisional of Ser. No. 09/038,190, filed Mar. 10, 1998, now issued as U.S. Pat. No. 6,377,795.

BACKGROUND OF THE INVENTION

1. Field of the Invention

The present invention relates to cellular telephones and, more particularly, to a cellular phone having a special standby feature.

2. Description of Prior Art

As is well known, cellular phones have a POWER button and a SEND button. When the POWER button is in the OFF position, the cellular phone is inoperable and cannot receive incoming calls, nor can it transmit outgoing calls. On the other hand, when the POWER button is in the ON position, the cellular phone is in a stand by mode and can receive incoming calls and transmit outgoing calls by pressing the SEND button. As a side note, in the ON mode, the cellular phone also communicates with base stations to determine reception level, hand-offs, etc. In digital-based cellular system, a voice mail system is available such that when the cellular phone is in the OFF position, the caller may leave a message for the user. The received message is stored in a base station voice mail system.

Because of the convenience offered by cellular telephones, they practically become an essential tool for businessmen and other professionals. However, at times, cellular phones create a distraction. For example, when businessmen hold a meeting, each person has to make a decision whether to turn his cellular phone off or keep it on. On many occasions, the users cannot afford to turn the cellular phone off because of business or other needs. Thus, it often occurs that a meeting is disturbed by the ring of a cellular phone and the user having to answer it.

SUMMARY OF THE INVENTION

The present invention provides a solution to the above noted problem, by providing a SPECIAL standby mode. The invention can be implemented in various ways; however, the basic idea is to have the cellular phone automatically accept the call and to allow the user the opportunity to exit the meeting without having to answer the call and disturb the meeting. Another feature of the invention is to allow the user to make a decision a priory, as to which calls will get through and which will be referred to the voice mail system.

DETAILED DESCRIPTION OF THE PREFERRED EMBODIMENTS

Figure 1:
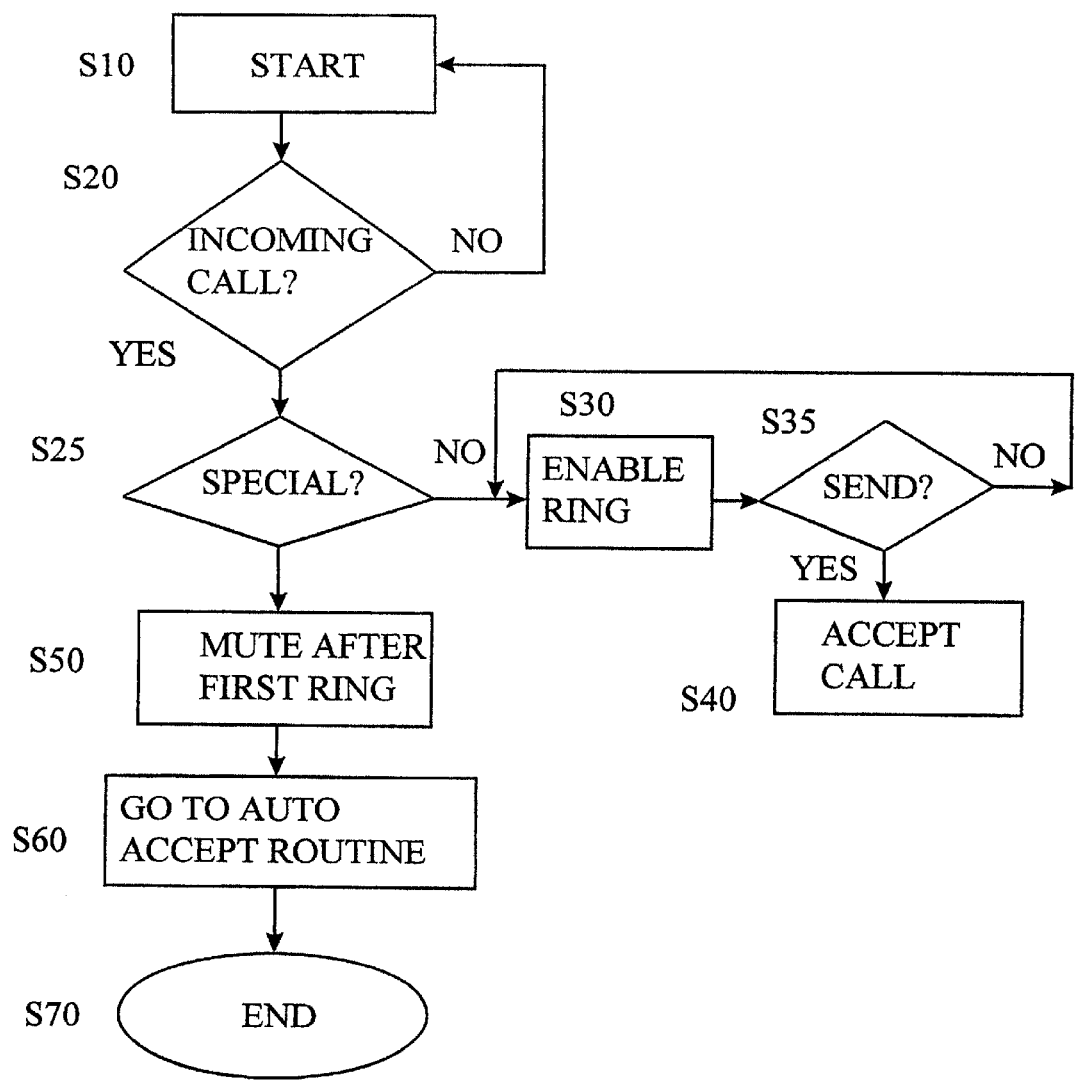
FIG. 1 is a flow chart depicting a routine of handling incoming calls according to an exemplary embodiment of the present invention.

An advantageous feature of the present invention is that it reduces distractions in meetings when a cellular phone receives an incoming call. Basically three elements can be dealt with and, preferably, all three are implemented. The first element is to reduce the disturbance caused by the ringing of the phone. The second element is to reduce the disturbance by having the phone automatically accept the call. The third element is to reduce the disturbance caused by the user having to talk to the caller before having the opportunity to exit the meeting. Various embodiments for implementing the three elements of the invention will now be described.

Regarding the first element, ringing, the solution should be preferably coupled to the solution of the second element. For example, according to one embodiment, in the SPECIAL mode, upon receiving an incoming call signal, the cellular phone rings only once. After the first ring the ringing is muted and the phone may go into the "accepting the call" routine of the second element of the invention. This will reduce the disturbance generally caused by the phone ringing about three times before the user reaching the phone and pressing the SEND button.

Another embodiment for handling the ringing problem is to adapt one of the pagers' solutions, i.e., a vibration or light option replacing the audible ringing. This embodiment seems less desirable, as in many meetings the phone is placed on a table or left in a brief case. Therefore, the "one ring" solution is the preferred embodiment.

Another solution relates to a particular feature of the invention, wherein the user can decide a priory as to which calls will go through and which will be forwarded to the voice mail system. According to this feature, the user is provided the option to preprogram the telephone to accept certain calls, and reject all other. For example, if a person has to go into a meeting, but is expecting an important call, that person can pre-program the phone to accept calls originating from the per-programmed number. Thus, when a call comes in, the phone will check the originating number included in the header of the transmission. If the number does not match any of the pre-programmed numbers, the telephone will reject the call and will not ring. On the other hand, if the originating number does match a pre-programmed, then the telephone would ring for the user to answer the call.

One problem in the prior art phone is that the user has to reach for the phone and press the SEND key in order to accept the incoming call. This creates a distraction, as it takes time for the user to reach for the phone and press the appropriate button, during all of which the phone is ringing. Accordingly, according to the present invention, in the SPECIAL mode, after the first ring (or after a number of rings adjustable by the user) the phone enters a routine to automatically accept the call. The simplest way of doing it is to simply automatically issue the SEND command by a program residing in the internal microprocessor. It would be appreciated that this feature can be incorporated with the feature just described above, so that when a call having the originating number match the pre-programmed number, the phone would automatically accept the call.

The third element of the invention is to allow the user sufficient time to exit the meeting. According to one embodiment, after the phone has automatically accepted the call, a special signal is sent to the calling party. Such signal may be a recognizable audible signal or an actual message informing the caller that the call has been accepted automatically and the user will answer the call shortly. This will put the caller on alert to hold the line and await an answer. Meanwhile, this will enable the user the opportunity to exit the meeting without having to talk to the caller in the meeting.

Regarding the third element, an advantageous feature is provided in the preferred embodiment. Specifically, after automatically accepting the call, a message is sent to the caller indicating that the phone is on SPECIAL mode, and requesting the caller to press a specific key, say # if he wishes to disturb the called party, or press another specified key, say *, if he does not wish to disturb the called party. When the called phone receives the appropriate signal after the calling party has pressed the chosen key, an appropriate indication is provided, to alert the called party. Specifically, if the calling party indicated that he doe not wish to disturb the called party, the called phone automatically execute a termination of call routine, or referral to the voice mail system routine. However, if the calling party wishes to disturb the called party, a special indication is provided by the phone and the communication channel is maintained open.

A specific feature of the above-described embodiment is an urgency rating system. That is, the user is allowed to rate the importance of the call. For example, #1 for urgent, #2 for important, and #3 for routine. If the call is rated #1, the call will go through and the phone would ring. If the call is rated #2, the caller is allowed to leave a message, which is stored in a priority over routine message and are not erased until the user purposely erases them. If the call is rated #3, the caller is allowed to leave a message, which is stored in a priority below #2 calls. Thus, when the user checks his messages, priority #2 messages will be played before priority #3 messages.

FIG. 1 is a flow chart depicting a routine of handling incoming calls as explained above. The routine starts at step S10, and checks for incoming calls at step S20. When an incoming call is detected, the routine checks whether the phone is in the SPECIAL mode in step S25. If not, the routine enables the ring at step S30 and continues to step S35 to see whether the user has pressed the SEND button. When the SEND button is pressed, the communication channel is established in step S40.

On the other hand, if the phone is in the SPECIAL mode in step S25, the routine mutes the ring after the first ring at step S50. Then the routine goes to a routine for automatically establishing the channel of communication. In its most simplistic implementation, this step can be simply a command to go to step S40. On the other hand, it is preferred that the routine depicted in FIG. 2 be used for step S40 of FIG. 1.

Figure 2:
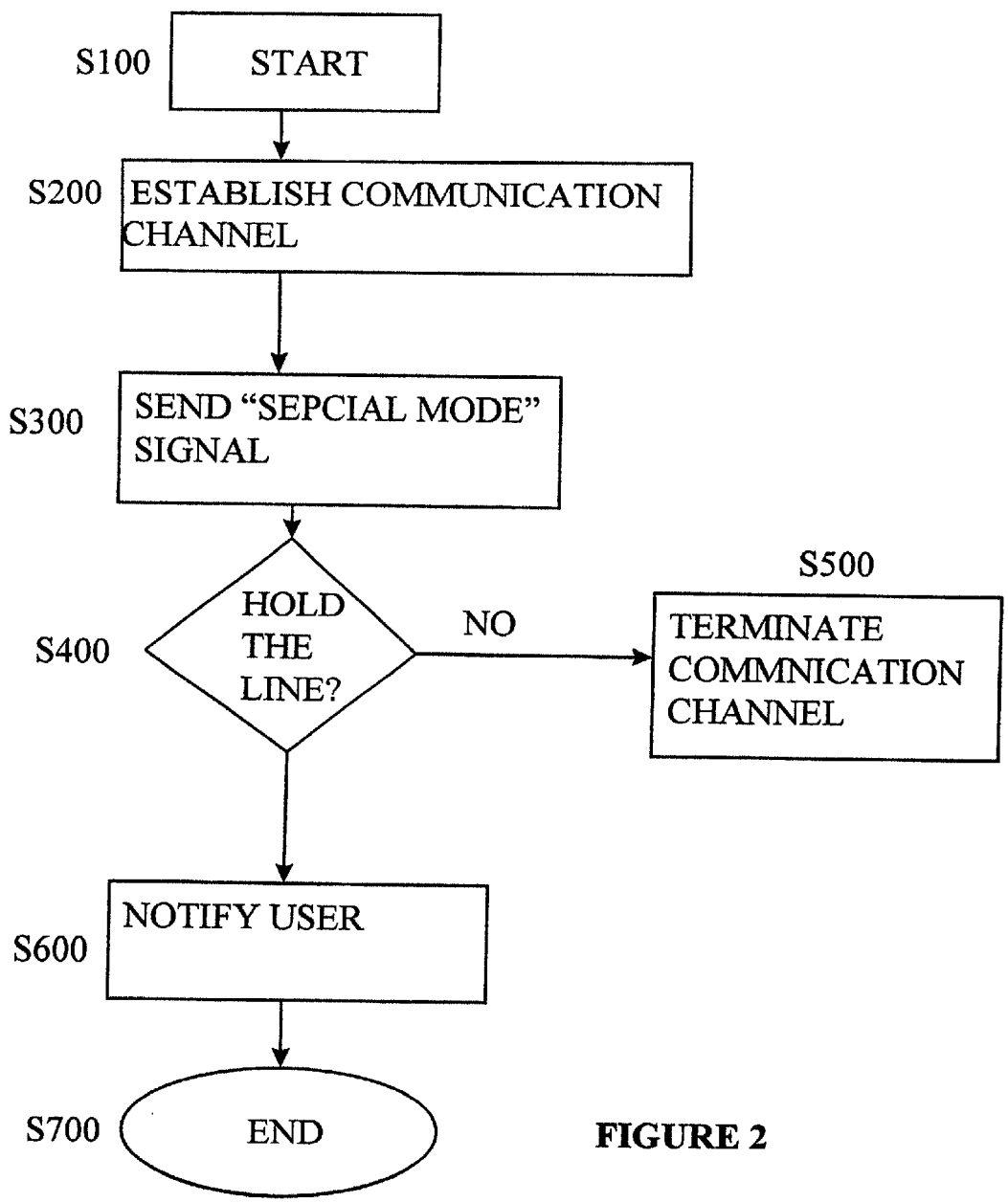
FIG. 2 is a flow chart depicting a routine for automatic call acceptance according to an exemplary embodiment of the present invention.

In FIG. 2, the routine first establishes a channel of communication in step S200. Then, in step 300 it sends a signal to the caller indicating that the called phone is in the SPECIAL mode. In the preferred embodiment, this signal constitute an audible recording previously made by the user. For example, such a message can be; "This is XYZ. My phone is in the SPECIAL mode since I'm in a meeting. If your call is urgent, please press # and I'll exit the meeting. Otherwise please press *." The routine then checks whether to hold the line at step S400. That is, if a # is returned, the channel is maintained. If a * is returned, the channel is disconnected at step 500. It should be noted that, similar to conventional phones, if the caller disconnects rather than returning a signal, the channel is disconnected. Further, rather than disconnecting the call, the caller may be forwarded to a voice mail system to leave a message.

When the channel is to be maintained, the user is notified at step S600. This can be done by, for example, providing a visual notification on the phone's screen, or by changing the background illumination color of the SPECIAL button. This will alert the user that the caller needs the user urgently, and that the channel has been established so that the user may exit the meeting to talk to the caller.

According to another feature of the present invention, the user is provided the option to block all incoming calls for a specified period. For example, the user may specify that all incoming calls should be rejected for 1 hour, when the user knows that the meeting would last one hour. This feature would avoid the need for the user to turn the phone off before the meeting, and forgetting to turn it back on after the meeting. Additionally, using this method the battery charged can be preserved by having the phone turning itself off for the designated period, and turning itself back on automatically when the designated period has elapsed. The only energy which would be required is for the timer, which is generally running in any case in order to memorize dates, etc.

Figure 3:
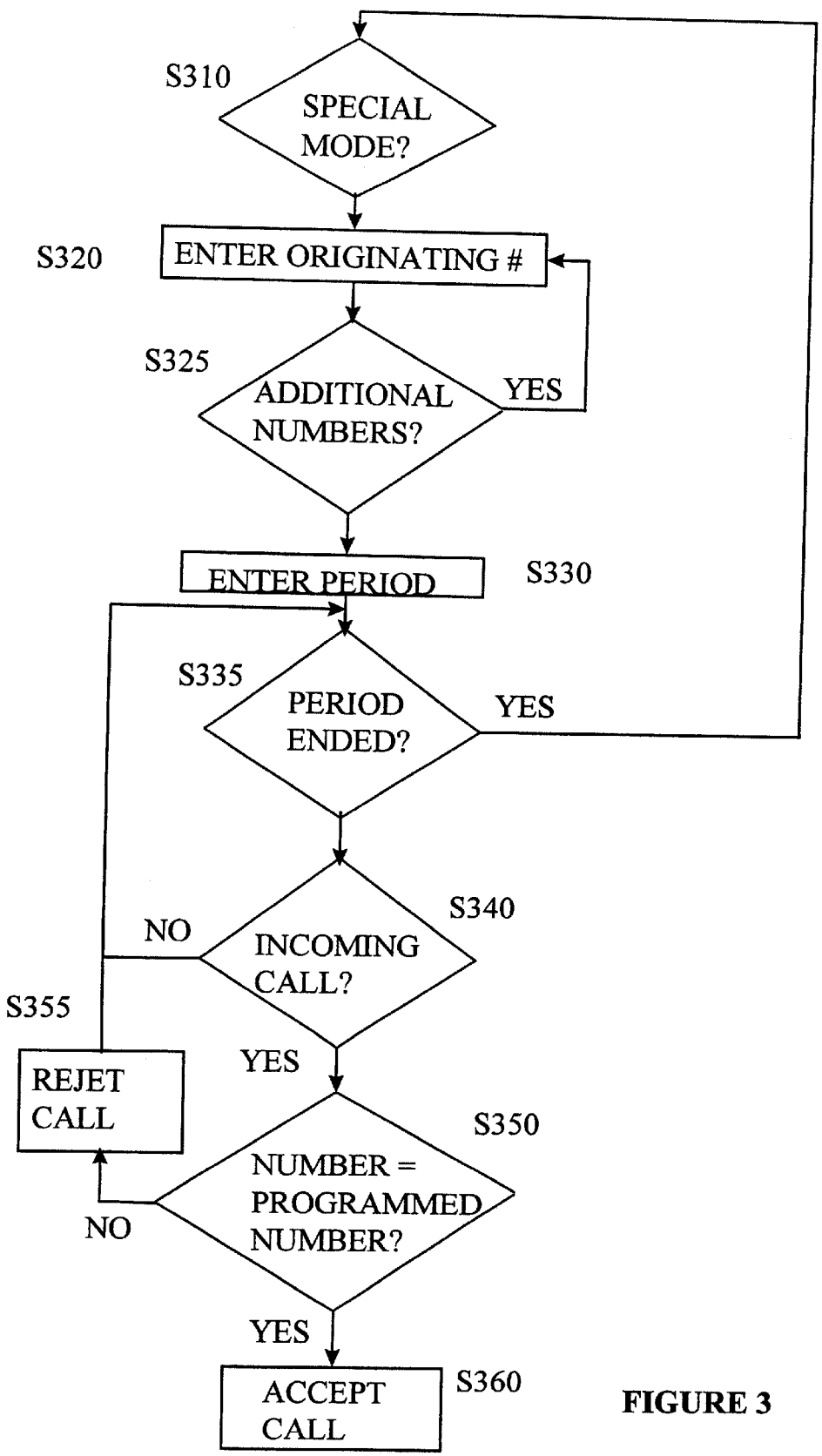
FIG. 3 is an exemplary flow chart incorporating several of the features of the invention.

FIG. 3 is an exemplary flow chart incorporating several of the features disclosed above. When it is determined that special mode has been activated at step S310, the user is prompted to enter telephone numbers for which the user wishes to accept a call at step S320. The entered number is stored in memory (not shown). At step S325 it is checked whether additional numbers are to be entered and, if so, the routine loops back to step S320. If no more numbers are to be entered, the routine proceeds to step S330, wherein the user is prompted to enter a time period for maintaining the special mode. In Step S335 it is checked whether the time period has elapsed and, if so, the routine goes back to check whether special mode has been activated.

If in step S335 it is determined that the period has not elapsed, the routine proceeds to step S340 to check whether a call is incoming. If not, the routine loops back to step S335. If a call is received, the routine proceeds to step S350 to check whether the originating number matches any of the stored numbers. If the number does not match any of the stored numbers, the routine proceeds to step S355 to reject the call, and then to step S335. If the number matches one of the stored numbers, the routine proceeds to step S360 to accept the call. It should be appreciated that at step S360 the routine can employ any of the methods described above to accept the call. For example, the routine can mute the ring after the first ring, as exemplified in the flow chart of FIG. 1, and then can perform the acceptance routine exemplified in FIG. 2.

While the invention has been described with reference to specific embodiments thereof, it would be appreciated by those of ordinary skill in the art that the invention is not limited to these embodiments, and that various modifications can be made without departing from the scope and spirit of the invention, as can be gathered from the specification and claims appended thereto.

What is claimed is:

1. A method for operating a cellular telephone of a user, comprising:

monitoring signals for incoming calls;

when an incoming call from a caller phone is detected, alerting the user of said incoming call;

establishing an audio channel of communication with said caller phone, thereby enabling said caller to converse with the user of said cellular phone;

sending a special signal to said caller indicating that the audio channel of communication has been established and the caller may converse with said holder; and, thereby enabling the user to accept a call from the caller without having to immediately talk to the caller.

2. The method of claim 1, wherein said alerting comprises providing a single ring and thereafter muting further rings.

3. The method of claim 1, wherein said audio signal comprises a pre-recorded message.

4. The method of claim 1, further comprising:
when an incoming call from a caller phone is detected, sending a message to said caller phone requesting an indication of the urgency of the call.

5. The method of claim 1, wherein said alerting and said establishing comprises:
providing a single ring and thereafter automatically establishing said audio channel of communication.

6. A method for operating a cellular telephone user, comprising:
monitoring signals for incoming calls;
when an incoming call from a caller phone is detected, sending a signal requesting an indication of the urgency of the call;
when a specified urgency of call is received, alerting the user of said incoming call, automatically establishing an audio channel of communication with said caller phone, and sending a special signal to said caller indicating that the channel of communication has been established and the caller may converse with said holder, thereby enabling the user to accept a call from the caller without having to immediately talk to the caller.

7. The method of claim 6, wherein said alerting comprises providing a single ring and thereafter muting further rings.

8. The method of claim 6, wherein said audio signal comprises a pre-recorded message.

9. A method for operating a cellular telephone comprising:
providing a user with an option to block incoming calls;
when the user selects the option to block incoming calls providing the user with an option to specify a period of time to block all incoming calls;
when the user enters a specified period of time to block all incoming calls, activating a timer to monitor the specified period of time;
rejecting incoming calls during the specified period of time;
when said timer indicates that the period of time has elapsed, ceasing to reject incoming calls;
providing a user with an option to specify subscriber numbers that should not be blocked during said specified period of time;
wherein when an incoming call is detected during said specified period of time performing:
when the incoming call subscriber number does not match a specified subscriber number, rejecting the call;
when the incoming call subscriber number matches a specified subscriber number, alerting the user of said incoming call, establishing an audio channel of communication with said caller phone, and sending a special signal to said caller indicating that the channel of communication has been established and the caller may converse with said holder thereby enabling the user to accept a call from the caller without having to immediately talk to the caller.

10. The method of claim 9, wherein said alerting comprises providing a single ring and thereafter muting further rings.

11. The method of claim 9, wherein said audio signal comprises a pre-recorded message.

12. The method of claim 9, further comprising:
when the incoming call subscriber number matches a specified subscriber number, sending a message to said caller phone requesting an indication of the urgency of the call.

13. The method of claim 9, wherein said alerting and said establishing comprises:
providing a single ring and thereafter automatically establishing said audio channel of communication.

* * * * *